United States Patent [19]

Lucas et al.

[11] Patent Number: 5,252,689
[45] Date of Patent: Oct. 12, 1993

[54] N-HYDROXYSUCCINIMIDE-BLOCKED ISOPROPENYL-ALPHA, ALPHA-DIMETHYLBENZYL ISOCYANATE AND SELF-CROSS LINKING COPOLYMERS THEREOF

[75] Inventors: Howard R. Lucas, Danbury; Kuang-Jong Wu, Shelton; William F. Jacobs, Bethel, all of Conn.

[73] Assignee: American Cyanamid Company, Stamford, Conn.

[21] Appl. No.: 963,778

[22] Filed: Oct. 20, 1992

[51] Int. Cl.$^5$ .............................................. C08G 18/80
[52] U.S. Cl. ..................... 526/227; 526/259; 526/262; 528/45; 546/243; 548/475
[58] Field of Search ............... 526/227, 259, 262; 528/45; 546/243; 548/475

[56] References Cited

U.S. PATENT DOCUMENTS

| | | | |
|---|---|---|---|
| 3,290,350 | 12/1966 | Hoover | 260/453 |
| 4,130,577 | 3/1983 | Nagato et al. | 260/453 P |
| 4,377,530 | 3/1984 | Singh et al. | 560/25 |
| 4,439,616 | 3/1984 | Singh et al. | 560/25 |
| 5,116,930 | 5/1992 | Yabuta et al. | 528/45 |

FOREIGN PATENT DOCUMENTS

| | | |
|---|---|---|
| 266659 | 5/1988 | European Pat. Off. |
| 186722 | 8/1988 | Japan |
| 087606 | 3/1989 | Japan |
| 2160534 | 12/1985 | United Kingdom |

OTHER PUBLICATIONS

D. K. Parker et al., Rubber Chemistry and Technology, vol. 63, No. 4, p. 584 (1990).
S. P. Pappas and E. H. Urruti, Proceedings of the Water-Borne and Higher-Solids Coatings Symposium, New Orleans, La., vol. 13, p. 146 (1986).
Z. W. Wicks, Jr., Progress in Organic Coatings, vol. 3, pp. 73-99 (1975).
Z. W. Wicks, Jr., Progress in Organic Coatings, vol. 9, pp. 3-28 (1981).

*Primary Examiner*—Maurice J. Welsh
*Attorney, Agent, or Firm*—M. J. Kelly; F. M. Van Riet; B. E. Lerman

[57] ABSTRACT

A novel, one component self-crosslinking resin and a process for its preparation are provided. The resin is the copolymer of:

(I) N-hydroxysuccinimide-blocked meta-isopropenylalpha, alpha-dimethylbenzyl isocyanate;
(II) a hydroxy group-containing ethylenically unsaturated monomer such as hydroxyethyl acrylate; and
(III) optionally, an ethylenically unsaturated monomer free of hydroxy groups such as methylmethacrylate or butyl acrylate.

The copolymers are useful as thermally stable fast curing one component resins for paint, and produce, upon heat curing, films and objects with good hardness and solvent resistance.

31 Claims, No Drawings

N-HYDROXYSUCCINIMIDE-BLOCKED ISOPROPENYL-ALPHA, ALPHA-DIMETHYLBENZYL ISOCYANATE AND SELF-CROSS LINKING COPOLYMERS THEREOF

BACKGROUND OF THE INVENTION

1. Field of the Invention

This invention relates to the preparation of self-cross-linking copolymers derived from an N-hydroxyimide, such as N-hydroxysuccinimide blocked isopropenyl-alpha, alpha-dimethylbenzyl isocyanate, and a hydroxy group containing olefinically unsaturated monomer. The self-crosslinking copolymers are useful as self-curing resins in coatings, adhesives, and moldings.

2. Description of the Related Art

In general, commonly used urethane coatings systems are of the two-component or one-component types.

A typical two-component paint, for example, comprises a polyisocyanate material and a polyhydroxy material, and, upon curing, can form films with excellent physical properties and resistance properties. They are used in high performance automotive coatings.

A typical one-component paint, for example, comprises a blocked polyisocyanate and a polyhydroxy material. Because the isocyanate groups are blocked, one-component systems have a generally longer shelf life than two-component systems containing free, hydroxy-reactive isocyanate groups. When desired, the one-component systems may be activated by, for example, heat, to deblock the blocked polyisocyanate and promote crosslinking.

Japanese Patent No. 63-186,722 discloses a coatings system wherein the blocked isocyanate and hydroxy groups are part of the same polymer backbone, thereby producing a self-crosslinking type one-component system. Similar ethanol-blocked copolymers are disclosed in JP 1-087,606.

U.S. Pat. No. 5,116,930 discloses another approach to a self-crosslinking resin accomplished by hydroxyfunctionalization of a polyisocyanate polymer. It is stated therein in column 1 and in Comparative Example 3, column 9, that when a self-curing resin is produced by copolymerizing an oxime-blocked isocyanate-containing radical-polymerizable monomer and a hydroxyl containing radical-polymerizable monomer, the blocking agent may undergo dissociation during polymerization disadvantageously leading to gelation, and, at the same time, leading to marked polymer discoloration. Furthermore, we have ourselves observed on numerous occasions the setting up of the contents of the reactor into a crosslinked gel during attempts to prepare the above-mentioned copolymers.

A solution for the gelation problem has been described in the co-pending application submitted concurrently herewith entitled "Process for the Preparation of Gel-Free Self-Crosslinking Copolymers Derived from Blocked Isopropenyl-Alpha, Alpha-Dimethylbenzyl Isocyanate," U.S. patent application Ser. No. 07/963,880, filed Oct. 20, 1992.

Another solution of the gelation problem is described herein. The solution comprises using a novel N-hydroxyimide-blocked isopropenyl-alpha, alpha-dimethylbenzyl isocyanate which:

1. has a higher deblocking temperature than oxime- or lactam-blocked isopropenyl-alpha, alpha-dimethylbenzyl isocyanates so that premature deblocking and gelation is prevented, but
2. has a lower deblocking temperature than alcohol-blocked isopropenyl-alpha, alpha-dimethylbenzyl isocyanates so that rapid cure is still obtained at conveniently low cure temperatures.

SUMMARY OF THE INVENTION

This invention provides gel-free self-cross-linking copolymers of novel N-hydroxyimide-blocked isopropenyl-alpha, alpha-dimethylbenzyl isocyanate, and a process for their preparation. The novel copolymers are useful as thermally stable but, at the same time, fast curing one-component resins for paints. Crosslinked films or objects are obtained by heat-curing the self-crosslinking copolymers of this invention.

DESCRIPTION OF THE PREFERRED EMBODIMENT

The novel N-hydroxyimide-blocked polymerizable isopropenyl-alpha, alpha-dimethylbenzyl isocyanate monomers usable in this invention are the meta- and para- isomers represented by the formulae:

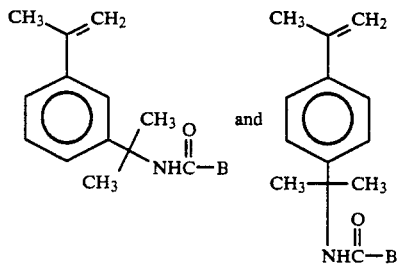

or a mixture thereof, wherein B is the conjugate base formed by an HB blocking group. The blocking group HB herein is an N-hydroxyimide blocking group selected from N-hydroxysuccinimide, dodecyl N-hydroxysuccinimide, methyl N-hydroxysuccinimide, N-hydroxyphthalimide, and a mixture thereof.

The blocking groups HB are represented by the formulae:

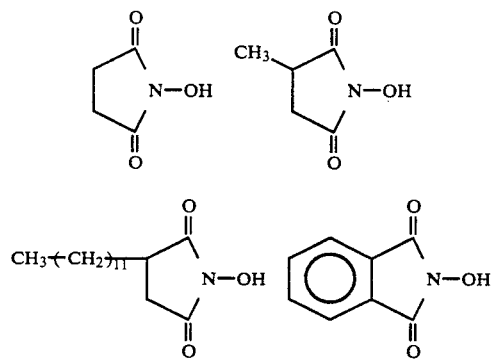

The novel self-crosslinking copolymer of the invention is a copolymer of:

(I) an N-hydroxyimide-blocked isopropenyl-alpha, alpha-dimethylbenzyl isocyanate;
(II) a hydroxy group containing ethylenically unsaturated monomer; and
(III) optionally, an ethylenically unsaturated monomer which does not contain hydroxy groups.

The copolymer is obtained by copolymerizing ingredients (I), (II), and, optionally, (III) in an appropriate solvent using a free radical initiator and optionally a chain transfer agent to control the molecular weight of the copolymer. These are discussed in greater detail below.

The polymerizable blocked isocyanate used in this invention is an isopropenyl-alpha, alpha-dimethylbenzyl isocyanate blocked with a blocking group such as N-hydroxy succinimide. The meta-isomer of the monomer, hereinafter m-TMI, is commercially available under the tradename TMI® (meta) Unsaturated Aliphatic Isocyanate from American Cyanamid Company, Wayne, N.J., as a colorless liquid of greater than 94 percent purity. The use of the meta- isomer to prepare the N-hydroxyimide-blocked polymerizable isocyanates is preferred. Other isomers, such as the para-isomer, hereinafter p-TMI, or a mixture of isomers, such as meta- and para- mixtures may also be used. The meta- and para- isomers of TMI are represented, respectively, by the formulae:

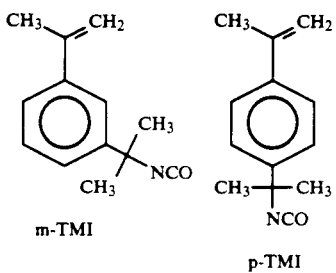

Various methods of preparation of TMI are described in U.S. Pat. Nos. 3,290,350; 4,130,577; 4,377,530; 4,439,616; and European Pat. Appln. No. 266,659.

The N-hydroxyimide-blocked isocyanates derived from TMI may be prepared by contacting TMI with, for example, an N-hydroxyimide such as N-hydroxysuccinimide, hereinafter NHS.

N-Hydroxysuccinimide-blocked meta-isopropenyl-alpha, alpha-dimethylbenzyl isocyanate is the preferred polymerizable blocked isocyanate monomer and is represented by the formula:

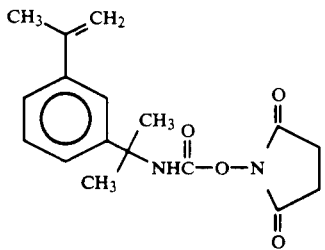

The self-crosslinking blocked isocyanate copolymers of the invention may be prepared by a process having the steps of:
(a) adding, over a period of time, to a reaction zone maintained at a temperature of at least about 30° C.:
(i) an organic solvent;
(ii) an N-hydroxyimide-blocked isopropenyl-alpha-dimethylbenzyl isocyanate;
(iii) a hydroxy group containing ethylenically unsaturated monomer;
(iv) optionally, an ethylenically unsaturated monomer free of hydroxy groups; and
(v) a free radical initiator; and
(b) thereafter heating at a temperature and for a length of time sufficient to produce a gel-free self-crosslinking resin.

The solvents usable in this invention may be relatively non-polar, or they may be highly polar. The non-polar organic solvents may be solvents from the class of aromatic hydrocarbons such as xylenes and toluene; halogenated solvents such as chloroform, carbon tetrachloride, chlorobenzene, and the like; esters such as ethyl acetate and butyl acetate; alcohols such as methanol, ethanol, isopropanol, butanol, and the like; ethers such as dibutyl ether; ketones such as acetone, methyl ethyl ketone, methyl isopropyl ketone, methyl isobutyl ketone, cyclohexanone and the like. Polar solvents are preferred, however, because they minimize deblocking.

The highly polar organic solvents usable in the process of the invention are organic solvents which have dipole moments higher than 3.0 Debye units, for example, and may include at least one member of the following general classes:
alkyl nitriles
cyclic sulfones
N-alkyl pyrrolidones
N,N-dialkyl formamides
N,N-dialkyl acetamides
alkyl formates
alkyl oxalates
hexamethylphosphorus triamide (HMPT)
hexamethylphosphoramide (HMPA)

The preferred solvents include acetonitrile, sulfolane, nitromethane, N-N-dimethylformamide, N,N-dimethylacetamide, N-methylpyrrolidone, and mixtures thereof.

The most preferred solvent is acetonitrile which has a dipole moment of 3.7 Debye units.

The hydroxy group containing ethylenically unsaturated monomer usable in this invention includes 2-hydroxyethyl acrylate, 2-hydroxyethyl methacrylate, 2-hydroxypropyl acrylate, 2-hydroxypropyl methacrylate, 2,3-dihydroxypropyl acrylate 2,3-dihydroxypropyl methacrylate, allyl alcohol, methallyl alcohol, and mixtures thereof.

In addition to the blocked TMI and the hydroxy group containing ethylenically unsaturated monomer, one or more ethylenically unsaturated monomers which do not contain hydroxy groups may be used in the process of the invention to impart certain physical and resistance properties to the copolymer. Such monomers include methyl acrylate, methyl methylacrylate, ethyl acrylate, ethyl methacrylate, propyl acrylate, propyl methacrylate, butyl acrylate, butyl methacrylate, ethylhexyl acrylate, ethylhexyl methacrylate, acrylonitrile, methacrylonitrile, styrene, alpha-methyl styrene, vinyl acetate, dialkyl fumarates, dialkyl maleates, vinyl chloride, vinylidene chloride, vinyl toluene, and mixtures thereof.

The free radical initiators usable in the process of the invention are initiators which are capable of generating free radicals at temperatures preferably in the range of about 75° C. to about 85° C., and include initiators such as azobisisobutyronitrile azobisvaleronitrile, benzoyl peroxide, tert-butyl peroctoate, tert-amyl peroctoate, tert-butyl hydroperoxide di-tert-butyl peroxide, dicumyl peroxide, and tert-butyl peroxyisopropylcarbonate.

To control the molecular weight of the copolymer, a chain transfer agent such as dodecyl mercaptan, also referred to herein as dodecyl thiol, may also be optionally used. Other well known methods such as lowering or raising the reaction temperature or the initiator level may also be employed to increase or decrease the molecular weight of the polymer, as desired The proportion of the ingredients in the reaction zone charge depends on the desired self-crosslinking copolymer composition.

The amount of the polar organic solvent in the total charge is from about 10 weight percent to about 90 weight percent, and preferably from about 40 weight percent to about 80 weight percent, based on the weight of the total charge. The term "total reaction zone charge" or "total charge" is used herein to mean the total amount of ingredients (i) to (v) including optional ingredients such as chain transfer agents and the like. The term "total monomer charge" or "total monomer" is used in the context of this invention to mean the total amount of ingredients (ii), (iii), and (iv). If more than one monomer is used as ingredient (iv) for example, then the total monomer content is the sum of all monomers used as ingredient (iv) in addition to the blocked TMI and the hydroxy group containing olefinically unsaturated monomer.

The term "crosslinkingly reactive components" is used herein to mean the total amount of ingredients (ii) and (iii).

The amount of total monomers in the total charge is in the range of from about 10 weight percent to about 90 weight percent, and preferably from about 40 weight percent to about 80 weight percent, based on the weight of the total charge The molar ratio of the blocked TMI to hydroxy group containing olefinically unsaturated monomer is from about 1.5:1 to about 0.5:1 and preferably about 1.1. The molar ratio of the crosslinkingly reactive components to the olefinically unsaturated monomer is from about 3:1 to about 0.1:1, and preferably from about 0.5:1 to about 1:1.

The amount of the free radical initiator is typically from about 0.01 weight percent to about 15 weight percent of the total monomers depending on the molecular weight desired It is typically from about 1 weight percent to about 8 weight percent of the total monomers.

The amount of the chain transfer agent, if used, may be from about 0.01 to about 15 weight percent of the total monomers depending on the molecular weight desired. It is typically from about 1 weight percent to about 4 weight percent of the total monomers.

The molecular weight of the copolymers obtained by the process of this invention is from about 1,000 to about 1,000,000, and preferably from about 5,000 to about 50,000.

In the preparation of the copolymers of the invention, ingredients (i) to (v) are simultaneously added in step (a) either as a homogenous mixture of all the ingredients, or each through a separate stream into the reaction zone maintained at a temperature preferably in the range of about 75° C. to about 85° C. When the ingredients are added through separate streams, one or more streams may be premixed prior to addition to the reaction zone. Furthermore the rate of addition of any ingredient may be kept the same, or varied as desired to carry out the copolymerization reaction at a deficiency or excess of that ingredient.

The addition is preferably carried out simultaneously by adding all the ingredients as a mixture or through separate streams. When the addition is sequential, a portion of the solvent is added first, followed by addition of the remaining ingredients, for example.

Another example of a sequential addition is when the free radical initiator is added last to the remaining ingredients.

The addition usually is carried out over a period of time in the range of about 1 hour to about 5 hours, but an addition time of about 3.4 hours is preferred.

The step (b) of the process is carried out by heating the reaction mixture further at about 75° C. to about 85° C. for a period of time from about 1 hour to about 5 hours. During the heating in step (b), an additional amount of a free radical initiator may be added to the reaction mixture to ensure complete polymerization of the monomers.

If the polymerization is carried out in a manner is which the total time of adding (step 1) and heating (step 2) exceeds 10 hours or when the temperature exceeds 115° C. for long periods of time, self crosslinking in the reactor may take place producing an insoluble crosslinked gel which may be difficult to remove from the reactor. Under the conditions of the preparation disclosed herein, gel formation is avoided and the method produces a gel-free self-crosslinking copolymer usable as a resin in coatings, moldings, and adhesives, for example.

EXAMPLE 1

4.4 g of acetonitrile was added to a flask and sparged with nitrogen for 10 minutes. With sparging continuing, the temperature was brought to 81° C. whereupon a solution of 31.5 g of methyl methacrylate, 40.3 g of butyl acrylate, 17.8 g of hydroxy-ethyl methacrylate, 42.7 g of n-hydroxy succinimide blocked m-TMI, 3.5 g of t-butyl peroctoate and n-dodecyl mercaptan was added over a period of 3 hours and 50 minutes. Heating was continued for an additional 4 hours and 10 minutes. Pan solids=76.0%; conversion was 99.8%; NCO analysis was 2.7% corresponding to 87.7% of theory. No gelation occurred. The number average molecular weight (Mn), weight average molecular weight (Mw) and polydispersity (Mw/Mn) were as follows:

Mn=11400
Mw=57500
Polydispersity=5.04.

EXAMPLE 2

The procedure of Example 1 was repeated, except a solution of 67.5 g of acetonitrile, 53.7 g of methyl methacrylate, 68.7 g of butyl acrylate, 29.9 g of hydroxyethyl methacrylate 72.7 g of m-TMI blocked with N-hydroxy succinimide, 9.0 g of t-butyl peroctoate and 4.5 g of n-dodecanethanol was added. The solution was added over a period of 3 hours and 30 minutes. Heating was continued at 81° C. for an additional 3 hours and 10 minutes. Pan solids were determined to be 75.5%. No gelation occurred.

EXAMPLE 3

The deblocking of blocked m-TMI derivatives was studied by Infrared Spectroscopic (IR) techniques to determine their response to heat, particularly to determine the onset temperature for deblocking reactions and also to determine the rapid deblocking temperatures of the blocked m-TMI derivatives. The results are summarized in TABLE 1.

TABLE 1

DEBLOCKING TEMPERATURES OF BLOCKED ISOCYANATES

| Blocking Group | Onset Temperatures For Deblocking (°C.) | Rapid Deblocking Temperatures (°C.) |
| --- | --- | --- |
| Methanol | 155* | 190* |
| n-Hexanol | 155* | 175* |
| N-Hydroxysuccinimide | 115** | 140** |
| e-Caprolactam | 90** | 125** |
| Acetone Oxime | 50** | 80** |
| Methyl Ethyl Ketone Oxime | 50** | 65** |

*Temperature ramp from 29° C. to 202° C. at 5° C./minute, with the infrared spectrum measured at intervals corresponding to 5° C. temperature change.
**Same as above except temperature ramp at 1° C./minute.

It is evident from the results in TABLE 1 that considerable deblocking occurs at typical polymerization temperatures which, in the case of self-crosslinking copolymer systems, would lead to gelation. It is also evident from the Table that N-hydroxysuccinimide-blocked m-TMI has a deblocking temperature above oxime or caprolactam-blocked analogs, but below alcohol-blocked systems.

EXAMPLE 4

Preparation of Blocked m-TMI Derivatives

The blocking of m-TMI is carried out by general methods and procedures used to prepare other blocked isocyanates, such as those described by Z. W. Wicks, Jr., in Progress in Organic Coatings, Volume 3, pages 73 to 99 (1975) and also ibid- Volume 9, pages 3 to 28 (1981).

A. Caprolactam-blocked m-TMI was prepared by the procedure described by D. K. Parker et al. in Rubber Chemistry and Technology, Volume 63, Number 4, page 584 (1990).

B. MEKO-blocked m-TMI was prepared by combining equimolar quantities of m-TMI and methyl ethyl ketone oxime (MEKO). The adduct has been mentioned in JP 63-186,722, GB 2,160,534, and by S. P. Pappas and E. H. Urruti in the proceedings of the Water-Borne and Higher-Solids Coatings Symposium, New Orleans, La., Volume 13, page 146 (1986).

C. Methanol-blocked m-TMI was prepared by adding m-TMI to a tenfold excess amount of methanol and heating at the boiling point of the mixture overnight.

D. Butanol-blocked m-TMI was prepared by adding m-TMI to a tenfold excess amount of normal butanol and heating at the boiling point of the mixture for 3 hrs.

E. N-Hydroxysuccinimide-blocked m-TMI was prepared as follows:

To a mixture of N-hydroxysuccinimide (197.8 g) obtained from Aldrich Chemical Company, Milwaukee, Wis., in a mixture of toluene (525 g) and methylene chloride (100 g), m-TMI was added dropwise at 45° C. to 50° C. over a period of 90 minutes with stirring. After allowing the mixture to stand overnight at room temperature, the colorless precipitate was collected by filtration under reduced pressure with the aid of a rubber dam, washed twice with 100 ml portions of toluene and dried at room temperature under reduced pressure to give N-hydroxysuccinimide-blocked m-TMI (438 g, 94% yield); melting point: 135°–137° C.; the infrared (in nujol) and $^1$H nuclear magnetic resonance spectra indicated that the product was N-hydroxysuccinimide-blocked m-TMI.

EXAMPLE 5

The general procedure of EXAMPLE 1 was repeated with the following amounts and reaction conditions: 7.5 g of acetonitrile was added initially to the 500 ml flask which was sparged with $N_2$ for 45 minutes. then heated to 81° C. A solution of 67.5 g of acetonitrile, 55.3 g of methyl methacrylate, 70.7 g of butyl acrylate, 30.8 g of hydroxyethyl methacrylate, 68.2 g m-TMI blocked with MEKO, 9.0 g of t-butyl peroctoate and 4.5 g of n-dodecylmercaptan was added over a period of 3 hours. Heating was continued at 81° C. for an additional 5 hours. Solids were determined to be 70.7%. No gelation occurred.

EXAMPLE 6

The procedure of EXAMPLE 1 was repeated, except a solution of 67.5 g of acetonitrile, 52.7 g of methylmethacrylate, 67.5 g of butylacrylate, 29.4 g of hydroxyethylmethacrylate, 75.5 g of m-TMI blocked with e-caprolactam, 9.0 g of t-butyl peroctoate and 4.5 g of n-dodecanethiol was added to the heated flask at 81° C. over a period of 3½ hours. Heating continued at 81° C. for an additional 4 hours. Pan solids were determined to be 72.7%. No gelation occurred.

EXAMPLE 7

The procedure of EXAMPLE 1 was repeated, except a solution of 67.5 g of acetonitrile, 56.0 g of methyl methacrylate, 71.7 g of butyl acrylate, 31.2 g of hydroxyl ethyl methacrylate, 66.1 g of m-TMI blocked with n-butanol, 9.0 g of t-butyl peroctoate and 4.5 g of n-dodecanethiol was added over a period of 3½ hours. After the addition, heating at 81° C. was continued for an additional 4 hours. Pan solids were determined to be 75.7%. No gelation occurred.

EXAMPLE 8

The following self-crosslinking copolymers prepared by the process of the invention were tested as one component self-crosslinking type resins for coatings:
(1) Product of Example 1 (Summarized in TABLE 2)
(2) Product of Examples 2, 5, 6, and 7 (Summarized in TABLE 3).

Each copolymer was dissolved in a mixture of methyl isobutyl ketone (42 percent), xylenes (16 weight percent), and 1-methoxy-2-propyl acetate (42 weight percent), and after adding a tin-based cure catalyst, the mixture was applied onto white base coated ED.11 primed cold roll steel (CRS) panels. The coated panels were then heated in a vented oven at a particular temperature/time schedule to produce the cured coatings. The results are summarized in TABLES 2 and 3. It is evident from TABLES 2 and 3 that the self-crosslinking copolymers of the invention produce coatings which have excellent hardness, solvent resistance, impact resistance, and a good cure response.

TABLE 2

CURED COATINGS FROM TIN-CATALYZED SELF-CROSSLINKING OF THE PRODUCT OF EXAMPLE 1

| | 30 min cure Temp (°C.) | Pencil Hardness | MEK Double Rubs | Impact Front/Reverse |
| --- | --- | --- | --- | --- |
| 0.1% T-12(1) | 110 | 2H | 50 | 140/140 |
| | 120 | 3H | 80 | 140/140 |
| | 130 | 3H+ | 125 | 140/140 |
| | 140 | 3H | | 200 + 140/140 |
| | 150 | 4H | | 200 + 140/140 |
| 0.1% | 120 | F | 70 | <20/20 |

TABLE 2-continued

CURED COATINGS FROM TIN-CATALYZED SELF-CROSSLINKING OF THE PRODUCT OF EXAMPLE 1

| | 30 min cure Temp (°C.) | Pencil Hardness | MEK Double Rubs | Impact Front/Reverse |
|---|---|---|---|---|
| TK-1 | 140 | 2H | 200 | 100/<20 |
| | 160 | 4H+ | | 200100/20 |

(1) T-12 is dibutyltindilaureate
(2) TK-1 is tetrabutyldiacetoxystanoxane (TBDAS)

TABLE 3

CURED COATINGS FROM TIN-CATALYZED SELF-CROSSLINKING OF THE PRODUCTS OF EXAMPLES 5, 2, 6, AND 7.

| Cure Response | Product of Example 5[1] | Product of Example 2[1] | Product of Example 6[1] | Product of Example 7[1] |
|---|---|---|---|---|
| 125° C., 30 min | | | | |
| Thickness, mils | 1.8 | 1.7 | 1.5 | 2.1 |
| Hardness $KHN_{25}$ | 10.5 | 10.5 | 8.4 | 3.1 |
| Pencil Hardness | F-H | F-H | H-2H | 2B-B |
| MEK Rubs Mar/Remove | 200+ | 100/200 | 20/200+ | 1/2 |
| Yellow Index | −2.3 | −2.3 | −2.5 | −3.3 |
| 135° C., 30 min | | | | |
| Thickness, Mils | 1.6 | 1.5 | 1.7 | 1.8 |
| Hardness $KHN_{25}$ | 11.9 | 11.4 | 9.3 | 3.5 |
| Pencil Hardness | F-H | F-H | H-2H | 2B-B |
| MEK Rubs Mar/Remove | 200 | 200+ | 200/200+ | 1/5 |
| Yellow Index | −1.6 | −.18 | −2.1 | −3.2 |
| 145° C., 30 min | | | | |
| Thickness, Mils | 1.6 | 1.5 | 1.7 | 1.8 |
| Hardness, $KHN_{25}$ | 11.9 | 11.6 | 10.3 | 4.9 |
| Pencil Hardness | F-H | H-2H | H-2H | 2B-B |
| MEK Rubs Mar/Remove | 200+ | 200+ | 200/200+ | 1/20 |
| Yellow Index | +0.6 | −0.8 | −1.7 | −2.9 |

[1]Contains 0.5% UL-28 catalyst based on solids. UL-28 is dimethyltindilaurate.

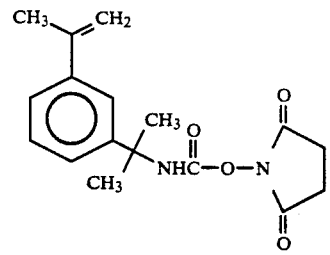

Although the present invention has been described with reference to certain preferred embodiments, it is apparent that modifications and variations thereof may be made by those skilled in the art without departing from the scope of this invention as defined by the appended claims.

We claim:

1. An N-hydroxyimide-blocked isopropenyl-alpha, alpha-dimethylbenzyl isocyanate.

2. The blocked isocyanate of claim 1 wherein the blocking group is selected from the group consisting of N-hydroxy-succinimide, methyl N-hydroxysuccinimide, dodecyl N-hydroxysuccinimide, N-hydroxyphthalimide, and a mixture thereof.

3. The blocked isocyanate of claim 2 wherein the blocking group is N-hydroxysuccinimide.

4. The blocked isocyanate of claim 1 wherein the isocyanate is selected from the group consisting of meta-, para- and a mixture of meta- and para-isopropenyl-alpha, alpha-dimethylbenzyl isocyanate.

5. The blocked isocyanate of claim 4 wherein the isocyanate is meta-isopropenyl-alpha, alpha-dimethylbenzyl isocyanate.

6. N-Hydroxysuccinimide-blocked meta-isopropenyl-alpha, alpha-dimethylbenzyl isocyanate represented by the formula:

7. A self crosslinking copolymer of:
(I) an N-hydroxyimide blocked isopropenyl-alpha, alpha-dimethylbenzyl isocyanate;
(II) a hydroxy group-containing ethylenically unsaturated monomer; and
(III) optionally, an ethylenically unsaturated monomer free of hydroxy groups.

8. The copolymer of claim 7 wherein the blocking group is selected from the group consisting of N-hydroxysuccinimide, methyl N-hydroxysuccinimide, dodecyl N-hydroxysuccinimide, N-hydroxy phthalimide, and a mixture thereof.

9. The copolymer of claim 8 wherein the blocking group is N-hydroxysuccinimide.

10. The copolymer of claim 7 wherein the isocyanate is selected from the group consisting of meta-, para-, and a mixture of meta- and para-isoprop- enyl-alpha, alpha-dimethylbenzyl isocyanate.

11. The copolymer of claim 10 wherein the isocyanate is meta-isopropenyl-alpha, alpha-dimethyl- benzyl isocyanate.

12. A self-crosslinking copolymer of:
(I) N-hydroxysuccinimide-blocked meta-isopropenyl-alpha, alpha-dimethylbenzyl isocyanate;
(II) a hydroxy group-containing ethylenically unsaturated monomer; and
(III) optionally, an ethylenically unsaturated monomer free of hydroxy groups.

13. The copolymer of clam 12 wherein the hydroxy group-containing monomer is selected from the group consisting of hydroxyethyl acrylate, hydroxyethyl methacrylate, hydroxypropyl acrylate, hydroxypropyl methacrylates, and mixtures thereof.

14. The copolymer of claim 12 wherein the ethylenically unsaturated monomer free of hydroxy groups is selected from the group consisting of methyl acrylate, methyl methacrylate, ethyl acrylate, ethyl methacrylate, butyl acrylate, butyl methacrylate ethylhexyl acrylate, ethylhexyl methacrylate, acrylonitrile, methacrylonitrile, styrene, and mixtures thereof.

15. A crosslinked film or object obtained by heat curing the self-crosslinking copolymer of claim 7.

16. A process for preparing a self-crosslinking copolymer, comprising:
    (a) adding, over a period of time, to a reaction zone maintained at a temperature of at least about 30° C.:
        (i) an organic solvent;
        (ii) an N-hydroxyimide-blocked isopropenyl-alpha, alpha-dimethylbenzyl isocyanate;
        (iii) a hydroxy group containing ethylenically unsaturated monomer;
        (iv) optionally, an ethylenically unsaturated monomer free of hydroxy groups; and
        (v) a free radical initiator; and
    (b) thereafter heating at a temperature and for a length of time sufficient to produce a gel-free self-crosslinking copolymer.

17. The process of claim 16 wherein ingredients (i) to (v) are added simultaneously.

18. The process of claim 16 wherein ingredients (i) and (v) are added sequentially.

19. The process of claim 16 wherein the hydroxy group containing unsaturated monomer is selected from the group consisting of hydroxyethyl acrylate, hydroxyethyl methacrylate, and a mixture thereof.

20. The process of claim 16 wherein the ethylenically unsaturated monomer free of hydroxy groups is selected from the group consisting of methyl acrylate, methyl methacrylate, ethyl acrylate, ethyl methacrylate, butyl acrylate, butyl methacrylate, ethylhexyl acrylate, ethylhexyl methacrylate, acrylonitrile, styrene, alpha-methyl styrene, vinyl acetate, dialkyl fumarate, dialkylmaleate, vinyl chloride, vinylidene chloride, vinyl toluene, and mixtures thereof.

21. The process of claim 16 wherein the free radical initiator is tertiary butyl peroctoate.

22. The process of claim 16 wherein the addition time in step (a) is from about 1 to about 5 hours.

23. The process of claim 16 wherein the heating time is from about 1 to about 5 hours.

24. The process of claim 16 wherein the temperature in step (a) and step (b) are both in the range of about 75° C. to about 85° C.

25. A process for preparing a self-crosslinking copolymer, comprising:
    (a) adding, over a period of about 1 to about 5 hours, to a reaction zone maintained at a temperature from about 75° C. to about 85° C.:
        (i) acetonitrile;
        (ii) an N-hydroxysuccinimide blocked isopropenyl-alpha, alpha-dimethylbenzyl isocyanate;
        (iii) a hydroxy group containing ethylenically unsaturated monomer;
        (iv) optionally, an ethylenically unsaturated monomer free of hydroxy groups; and
        (v) a free radical initiator; and
    (b) thereafter heating at a temperature of about 75° C. to about 85° C. for a period of about 1 to about 5 hours to produce a gel-free self-crosslinking polymer.

26. The process of claim 25 wherein the hydroxy group containing monomer is selected from the group consisting of hydroxyethyl acrylate, hydroxyethyl methacrylate, and a mixture thereof.

27. The process of claim 25 wherein the ethylenically unsaturated monomer free of hydroxy groups is selected from the group consisting of methyl acrylate, methyl methacrylate, ethyl acrylate, ethyl methacrylate, butyl acrylate, butyl methacrylate, and a mixture thereof.

28. A process for preparing a self-crosslinking copolymer, comprising:
    (a) adding, over a period of about 1 to about 5 hours, to a reaction zone maintained at a temperature from about 79° C. to about 82° C.:
        (i) acetonitrile,
        (ii) N-hydroxysuccinimide blocked meta-isopropenyl-alpha, alpha-dimethylbenzyl isocyanate;
        (iii) hydroxyethyl acrylate or methacrylate;
        (iv) a monomer selected from the group consisting of methyl methacrylate, butyl acrylate, and a mixture thereof; and
        (v) tert-butyl peroctoate; and
    (b) thereafter heating at a temperature of about 79° C. to about 82° C. temperature for a period of about 1 to about 5 hours to produce a gel-free self-crosslinking copolymer.

29. A gel-free self-crosslinking copolymer prepared by the process of claim 16.

30. A gel-free self-crosslinking copolymer prepared by the process of claim 25.

31. A gel-free self-crosslinking copolymer prepared by the process of claim 28.

* * * * *